United States Patent Office 2,967,839
Patented Jan. 10, 1961

2,967,839

COATING COMPOSITION OF AN AMINOTRIAZINE/ALDEHYDE RESIN AND ESTERS OF OXYALKYLATED PHENOL-ALDEHYDE RESIN

Ronald L. Millar, Elmhurst, and Charles G. Moore, Elmwood Park, Ill., assignors to The Glidden Company, Cleveland, Ohio, a corporation of Ohio No Drawing. Filed June 14, 1955, Ser. No. 515,538

13 Claims. (Cl. 260—19)

This invention relates to novel coating compositions in which the film-forming material is a blend of aminotriazine aldehyde resin(s) and esters of oxyalkylated phenol-aldehyde resins. It relates particularly to such coating compositions which are particularly adapted for use as flow-coating primers for metal and which exhibit excellent alkali, soap and salt spray resistance in combination with improved penetrating qualities and reduced costs when compared with flow-coat primers of the epoxy resin, epoxy resin-urea formaldehyde, or oxyalkylated phenol-aldehyde ester types. Our compositions are particularly characterized by their ability to be reduced prior to and during application with aliphatic hydrocarbon solvents.

At the outset it should be recognized that our invention involves the preparation of a novel combination of two types of resins both of which are individually well known in the art. The merits of the combination are based in part on our discovery that the addition of known aminotriazine/aldehyde resin(s) imparts unexpected improvement in alkali and soap resistance to the combination over the resistance properties afforded by the known esters of oxyalkylated phenol-aldehyde resins. While the aminotriazine/aldehyde resins can be employed in any desired proportions (1–99%) on the oxyalkylated phenol-aldehyde esters, we especially prefer to have the aminotriazine/aldehyde resins present in amounts between about 10% and 40% by weight on the total resin solids of the blended combination when used in flow-coating applications. The compositions can be clear or pigmented and can be applied to metal and other substrates by application methods other than flow-coating, e.g., dipping, spraying, brushing, etc., but our preferred proportions give vehicles of outstanding merit in protective qualities and reduced costs when pigmented and applied by flow-coating practices.

It accordingly is one object of this invention to provide a novel film-forming composition prepared by combining aminotriazine/aldehyde resins(s) with esters of oxyalkylated phenol-aldehyde resin(s).

It is another object to provide improved coating compositions of the above type particularly adapted for application by flow-coating practices.

It is a further object to provide flow-coat primers having excellent protective qualities in combination with lower costs than have heretofore been possible in flow-coat primers of comparable or somewhat inferior protective qualities.

It is another object to provide flow-coat primers characterized by unexpectedly improved penetrating qualities which assure the formation of protective primer films in crevices, joints, etc. which heretofore would have remained uncoated by conventional flow-coat primers.

Baked primers which have been applied to metal (especially ferrous metal) by conventional flow-coating techniques have been known and used extensively for many years. In the past, however, such primers have required the use of expensive high-solvency solvents, such as aromatic and/or oxygenated solvents. Flow-coating technique (which in a crude form is analogous to flooding an article with liquid paint from a hose or pipe, allowing the excess to drain away so as to be caught and then recirculating the caught coating back to the hose or pipe for coating additional articles) involves the loss of much solvent and necessitates intermittent or continuous replenishment of solvent in the recirculated portion. It is apparent that the technique requires the use of far greater amounts of solvent than would be needed in other application methods. The cost of solvent consumed in flow-coating technique is accordingly a substantial portion of the total cost of coating an article, and it has been recognized that substantial economies could be secured if cheaper solvents, such as aliphatic hydrocarbons, could be used. It has been recognized as a corollary thereto that in order to use such cheaper solvents, the film-forming materials of conventional flow-coat primers would necessarily have to be replaced with materials which would be compatible with such cheaper solvents but which would at the same time still yield films having excellent protective qualities. Thus, while the problem has been clearly defined, as far as we are aware no satisfactory solution to it has heretofore been provided. We have now discovered, however, that our novel combinations of aminotriazine/aldehyde resin(s) with esters of oxyalkylated phenol-aldehyde resin(s) provide baked films having the necessary protective qualities while yet being reducible with aliphatic solvents.

For the sake of clarity and convenience, the two film-forming components of our novel combination will be discussed under separate headings hereinafter. The components which are selected for use, however, are blended together to form our improved vehicles and may then be pigmented, if desired, or applied in unpigmented form. When pigmented, any of the usual pigments, fillers, extenders, etc. can be used in any desired amounts to give glossy films, semi-gloss finish or flat finishes. Where our preferred primer compositions are being prepared, conventional priming pigments and fillers are used in conventional ratios to vehicle solids. The coatings which result can, of course, be thinned with a variety of compatible solvents to desired application viscosities, but since our coating vehicles have broad tolerance for aliphatic solvents, such as mineral spirits, such solvents can be used advantageously whenever thinning is needed.

THE AMINOTRIAZINE/ALDEHYDE RESIN COMPONENT

This component of our vehicles is broadly a reaction product of (1) an aldehyde (including polymeric aldehydes, hydroxy aldehydes and aldehyde-addition products) and (2) an aminotriazine, one form of which can be represented by the general Formula I:

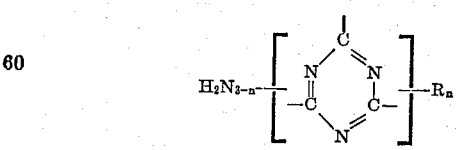

where $n$ represents an integer which varies from 0 to 2, and R represents a monovalent aliphatic radical which has replaced hydrogen, such as monovalent hydrocarbon or alkoxy radicals. The aminotriazine derivatives used in practicing the present invention are prepared, for example, by effecting reaction under alkaline conditions which are maintained throughout the entire reaction period and in the presence of an inorganic base, between (1) an aminotriazine derivative represented by the general Formula II:

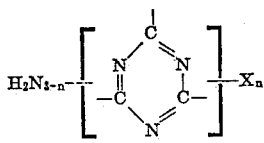

where $n$ has the same meaning as given above and where X represents a halogen selected from the class consisting of chlorine and bromine, and (2) an appropriate compound capable of replacing X with R.

As noted above, one class of aminotriazine resins of this invention is prepared by reaction of an aldehyde with an aminotriazine corresponding to general Formula I. The aldehyde includes polymeric aldehydes, hydroxyaldehydes and aldehyde-addition products, e.g., formaldehyde, paraformaldehyde, alkol, dimethylol urea, trimethylol melamine, etc. The choice of aldehyde is dependent largely upon economic considerations and upon the properties desired in the finished product. We prefer to use formaldehyde or compounds engendering formaldehyde, e.g., paraformaldehyde, hexamethylene-tetramine, trioxane, trioxymethylene, etc. Other aldehydes tl .t can be used include acetaldehyde, propionaldehyde, butyraldehyde, heptaldehyde, acrolein, methacrolein, crotonaldehyde, benzaldehyde, furfural, glucose, glycollic aldehyde, glyceraldehyde, mixtures thereof or mixtures of formaldehyde and/or compounds engendering formaldehyde with such aldehydes. Illustrative examples of aldehyde-addition products that can be used instead or along with aldehydes are the mono- and poly-(N-carbinol) derivatives, more particularly the mono- and poly-methylol derivatives of urea, thiourea, iminourea and of substituted ureas, thioureas, and iminoureas, mono- and poly-(N-carbinol) derivatives of amides of polycarboxylic acids, e.g., amides of maleic, itaconic, fumaric, adipic, malonic, succinic, citric, phthalic, etc., mono- and poly-(N-carbinol) derivatives of the aminotriazoles, of the aminodiazines, etc. Good results are obtained with aldehyde-addition products, such as methylol melamines, e.g., monomethylol melamine and polymethylol melamines (di- and tri-methylol). Mixtures of aldehydes and aldehyde-addition products can be employed.

We have found that aminotriazine/aldehyde resins derived from components including urea moieties are among the least satisfactory for use in our novel compositions. Such tend to reduce the alkali resistance of the film-forming compositions and hence it is preferred that such aldehyde-source material, i.e., material which supplies not only the desired aldehyde component but also a urea which gives rise to urea-aldehyde condensation products, should be present, if at all, in relatively minor amounts.

The ratio of the aldehydic reactant to the monomeric or polymeric aminotriazine derivative(s) can be varied over a wide range depending, for example, upon the number of aldehyde-reactable amino groups in the aminotriazine derivative(s) and upon the particular properties desired in the finished product. Ordinarily these reactants are employed in an amount corresponding to at least 1 mol of the aldehyde, specifically formaldehyde, for each mol of the aminotriazine derivative. Thus we can use, for instance, from about 1 to 5 or 6 or more mols of the aldehyde for each mol of a monomeric aminotriazine derivative and equivalent molar ratios when the aminotriazine derivative is in polymeric state. In the case of a polymeric aminotriazine reactant, the aldehyde can be employed in an amount corresponding to about 1 to 6 or more mols thereof for each aminotriazinyl grouping in the polymer. Good results are obtained when the aldehyde is used in an amount corresponding to about 1 to 2 mols thereof for each amino grouping in the monomeric or polymeric triazine derivative. When the aldehyde is available for reaction in the form of an alkylol derivative, more particularly a methylol derivative, e.g., trimethylol melamine, amounts of such alkylol derivatives corresponding to or higher (e.g., from a few percent more to 15 to 20 times as much) than the relative amounts mentioned above with reference to the aldehyde may be employed.

The reaction between the aldehyde, e.g., formaldehyde, and the monomeric or polymeric aminotriazine derivative can be carried out in the presence of solvents or diluents, other natural or synthetic bodies (numerous examples of which hereafter are given), or while admixed with other materials which are reactable or non-reactable with the aldehydic reactant or with the aminotriazine derivative, e.g., urea, thiourea, cyanamide, dicyandiamide, terephthalic diamide, acetamide, chlorinated acetamides, methyl ethyl ketone, etc.; aldehyde-reactable aminotriazinyl compounds other than the aminotriazine derivatives used in practicing the present invention, e.g., melamine, ammeline, ammelide, etc.; phenol and substituted phenols, e.g., the cresols, the xylenols, the tertiary-alkyl phenols, etc.; monohydric and polyhydric alcohols, e.g., butyl alcohol, amyl alcohol, heptyl alcohol, n-octyl alcohol, 2-ethylhexyl alcohol, ethylene gycol, propylene glycol, glycerine, polyvinyl alcohol, etc.; amines, including propyl amine, dibutyl amine, aniline, etc.

The modifying reactants can be incorporated with the aminotriazine derivative (monomeric or polymeric aminotriazine derivative) and the aldehyde to form an intercondensation product by mixing all the reactants and effecting condensation therebetween under acid, alkaline or neutral conditions, or by various permutations of reactants. For example, we can effect partial reaction or condensation between the chosen aldehyde and the aminotriazine derivative under acid, alkaline or neutral conditions, then add the modifying reactant, e.g., melamine, n-butanol, etc., and effect further condensation under acid, alkaline or neutral conditions. Or, we can first partially react melamine or other aldehyde-reactable modifying reactant with a molecular excess of an aldehyde under acid, alkaline or neutral conditions, then add the aminotriazine derivative and effect further condensation under the same or different conditions of acidity or alkalinity. Or, we can separately partially react (1) melamine or other aldehyde-reactable modifying reactant and an aldehyde and (2) aminotriazine derivative of the kind embraced by Formula I and an aldehyde, thereafter mixing the two products of partial reaction and effecting further reaction or condensation therebetween. The reactants of (1) and (2) can be partially condensed under acid, alkaline or neutral conditions.

In practicing our invention the initial condensation reaction between the reactants can be carried out at normal or at elevated temperatures, at atmospheric, subatmospheric or superatmospheric pressures, and under neutral, alkaline or acid conditions. Any substance yielding an alkaline or an acid aqueous solution can be used in obtaining alkaline or acid conditions for the initial condensation reaction. For example, we can use an alkaline substance, such as sodium, potassium or calcium hydroxide, sodium or potassium carbonate, a mono-, di- or tri-amine, etc. Illustrative examples of acid condensation catalysts that can be employed are inorganic or organic acids, e.g., hydrochloric, sulfuric, phosphoric, acetic, lactic, acrylic, phthalic, maleic, etc., or acid salts, such as sodium acid sulfate, monosodium phosphate, monosodium phthalate, etc. Mixtures of acids, of acid salts or of acids and of acid salts can be employed if desired.

Methods for preparing aminotriazine/aldehyde reaction products of the types described above for coating purposes are well known in the art but the following examples are illustrative.

Example 1

| | Parts |
|---|---|
| 2,4,6-triamino-1,3,5-triazine | 63.5 |
| Aqueous formaldehyde (approx. 37% HCHO) | 162.0 |
| n-Butanol | 220.0 | are heated together for about 2 hours and 10 minutes at 87° to 100° C., additional butanol being added from time to time to replace the volatile matter removed by distillation and to keep constant the volume of the reaction mass. The resulting liquid resinous composition is thinned to 50% resin solids with butanol or a mixture of butanol and xylene to form a liquid coating composition.

Example 2

| | Parts |
|---|---|
| 2,4,6-triamino-1,3,5-triazine | 63.5 |
| Melamine | 63.0 |
| Aqueous formaldehyde (approx. 37% HCHO) | 405.0 |
| n-Butanol | 440.0 | are heated together at 93°–106° C. for about 6⅓ hours, additional butanol being added from time to time to replace the volatile matter which distills off and to keep constant the volume of the reaction mass. At the end of this reaction period, distillation is continued under reduced pressure at a temperature of about 90° C. until the liquid resinous mass contains about 72.3% resin solids. The liquid resin is diluted with butanol or mixtures of butanol and xylene until it contains, for example, about 50% resin solids.

Example 3

| | Parts |
|---|---|
| Aqueous formaldehyde (approx. 37% HCHO) | 162.0 |
| 2,4,6-triamino-1,3,5-triazine | 63.5 |
| Phosphoric acid (85%) | 0.5 |
| n-Butanol | 220.0 |

The aqueous formaldehyde is adjusted to a pH of 8.0 with 0.5 N sodium hydroxide. A mixture of this solution and the triazine derivative is placed in a suitable reaction vessel provided with a reflux condenser, and therein heated until it begins to reflux. The reflux condenser is arranged for downward distillation and then the butanol with the phosphoric acid dissolved therein is slowly added when the reaction mass is at a temperature of 85° C., keeping the temperature of the mass at 85°–90° C. during this addition.

Reaction is continued at 94°–110° C. for about 4½ hours, adding additional butanol from time to time to replace the volatile matter which distills and to keep constant the volume of the reaction mass. After filtering the resulting liquid mass through a pressure filter, it is heated under reduced pressure at about 90° C. until the liquid resin contains about 83.4% resin solids. To this liquid resin are now added 58 parts butanol (n-butanol) and 87.5 parts xylene to reduce the resin solids content to about 50%.

U.S. Patent No. 2,290,133, here incorporated, discloses methods for preparing melamine-formaldehyde resins.

Aminotriazine/aldehyde resins suitable for use herein are currently available as proprietary products, typical ones being Rohm and Haas' Uformite MX61 and Uformite MM47, and American Cyanamid's Melmac 247–10. The latter two are melamine-formaldehyde resins of the types just described, while the Uformite MX61 is a non-melamine aminotriazine resin of a type described more fully below. Uformite MM47 is a solution of 60% solids in a mixture of equal parts of xylol and butanol, which solution has a viscosity of P-T (Gardner-Holdt), and an acid number of 1 or less. The solution can be reduced with xylol, toluol, high boiling aromatic naphthas, ketones and esters. Additional butanol can be used where lower viscosities and higher solids are desired. Mineral thinner tolerance is good, 35 cc. minimum per 10 grams of solution. Melmac 247–10 is very similar.

MX61 is a butylated bis(aminotriazine)-aldehyde resin of the type whose preparation is described in U.S. Patent No. 2,653,143, that disclosure being here incorporated by reference. As there disclosed, such resins have excellent tolerance for mineral spirits and therefore are especially useful in preparing our preferred primers. The commercial product MX61 is supplied at 60% solids in a 1:1 mixture of xylol and butanol, at a viscosity of G–K (Gardner-Holdt). Its mineral thinner tolerance is 50 cc. per 10 grams of resin solution.

As shown in U.S. Patent No. 2,653,143 the bis aminotriazines which are reacted with aldehyde(s) and/or formaldehyde engendering addition products to form the second class of resins contemplated for use in this invention, are compounds having the general Formula III:

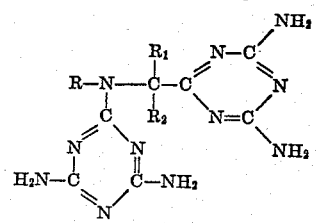

in which R is an alkyl group of one to 8 carbons and which contains a hydrogen atom on the carbon atom adjacent to the nitrogen atom, $R_1$ is a hydrogen or a methyl group, and $R_2$ is an alkyl group of 1 to 8 carbons. In addition to reacting with aldehydes, the compounds can be reacted with alcohols in the presence of the aldehydes to give condensates having desirable properties for coatings. Example 4 below illustrates the use of this class of compounds in the present invention.

THE ESTERIFIED OXYALKYLATED PHENOL-ALDEHYDE COMPONENT

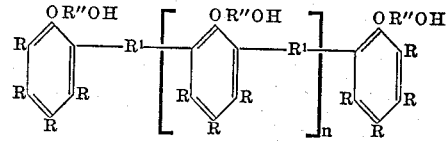

where R represents hydrogen and/or alkyl radicals of 4–18 carbons, $R^1$ represents a methylene or higher radical of an aldehyde containing up to 8 carbons, $R''$ represents an alkylene radical of up to 4 carbons and $n$ represents an integer of 1 to 13 or more. Oxyalkylated phenol-aldehyde components of this type are described in U.S. Patent No. 2,610,955, and the disclosure of this patent is herein incorporated by reference. That patent also discloses the preparation of esters of the esterifiable component. An esterifiable, oxyalkylated phenol-aldehyde resin corresponding to the above is presently available commercially from The Dow Chemical Company (Dow Resin 622) and methods for esterifying this resin are described in Paint, Oil and Chemical Review, February 24, 1955, pages 9–16. A Dow Bulletin entitled "Dow Resin 622 in Surface Coatings" (November 1954) also describes the preparation of esters of the resin. The disclosures of these publications are incorporated herein by reference.

For the purposes of the present invention the esterifiable oxyalkylated phenolic resin or mixture of resins is preferably esterified with acids of drying and semi-drying oils although useful esters can also be prepared with acids of non-drying oils. Mixtures of acids of the latter oils with acids of the drying and semi-drying oils can be used. Minor amounts of dibasic acids can also be used, preferably in amounts below about 5% by weight on the total acids. The esterifiable phenolic resin(s) can be esterified with the foregoing acids rather easily to give products having low acid numbers (below 20), the practices employed in the esterification being already described in the foregoing publications. The fatty acids can be used in amounts between about 15% by weight on the esterified product up to 1:1 molar proportions on esterifiable hydroxyls.

The following examples illustrate the best methods presently known to us for practicing the principles of our invention for providing coating compositions which are solvent blends of aminotriazine/aldehyde resin(s) with esterified oxyalkylated phenolic-aldehyde resins.

Example 4

An esterified phenolic resin of the type described above was prepared from 660 parts by weight of Dow Resin 622, 540 parts of dehydrated castor oil fatty acids and 1424 parts by weight of mineral spirits having a Kauri butanol value of 36.5. The Dow Resin 622 had a softening point of 57° C. and an equivalent weight of 152 (grams of resin required to completely esterify one mol of monobasic acid).

The 622 resin and the fatty acids were charged to a kettle and blanketed with nitrogen continuously thereafter. The kettle was then heated to 400° F. and held heer for 1.5 hours to prevent foaming. The heat was next raised to 460° F. and was held until a sample of the contents attained a viscosity of $Z_1$ (Gardner-Holdt) at 45% solids in mineral spirits. The heat was then discontinued and the mineral spirits was added to bring the non-volatile matter (NVM) to 45%. The resulting solution was next carefully filtered while hot to secure a completely clear solution. The acid number of the resulting prouct was about 1, and its color was 8-9 (Gardner).

An aminotriazine/aldehyde resin was prepared in the following manner:

(A) Preparation of

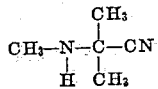

Over a period of two hours 132.2 parts of gaseous monomethylamine was added to 340.4 parts of acetone cyanohydrin. During the addition the temperature was kept in the range of −10° C. to +10° C. The reaction mixture was then stripped at room temperature and used in part B without further purification.

(B) Preparation of

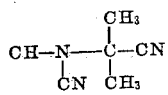

The crude aminonitrile as prepared in part A was mixed at 10° C. with 352 parts of benzene, 276.8 parts of anhydrous potassium carbonate, and 128 parts of water. There was then added at 15°–25° C. and over a period of 65 minutes 246 parts of cyanogen chloride. Stirring was continued for one-half hour at room temperature and the reaction mixture allowed to stand overnight. It was then heated to 50° C., cooled, the aqueous layer separated, and the benzene layer filtered, dried over anhydrous magnesium sulfate and distilled. There was obtained 213.5 parts of a light brown oil boiling at 89°–90° C. at 2 mm.

(C) Preparation of

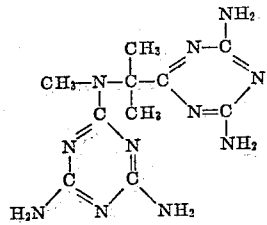

To a stirred mixture of 200 parts of isopropanol, 128.2 parts of the cyanoaminonitrile as prepared in part B, and 193 parts of dicyanodiamide there was added at reflux (75–85° C.) and over a period of 90 minutes a solution of 35 parts of 85% potassium hydroxide in 400 parts of isopropanol. The mixture was stirred at reflux for 20.5 hours and then cooled. The fine white solid which had formed was filtered off and washed with hot water. Two hundred twenty-six parts of the bis-(aminotriazine) was obtained. It melted at 430°–435° C.

Into a three-necked flask equipped with reflux condenser, mechanical agitator, thermometer, and water separator were charged 72.75 parts (0.25 mol) of the ditriazine, last above, 124.0 parts (1.5 mols of HCHO) of a solution of formaldehyde in n-butyl alcohol prepared from 49.6 parts of paraformaldehyde (91%) and 74.4 parts of n-butyl alcohol, 124.0 additional parts of n-butyl alcohol and 29.0 parts of xylol. The pH of the reaction mixture was 7.2–7.4 (bromothymol blue). The mixture was heated to reflux temperature (110° C.) and held at that temperature for 30 minutes. At this point the pH was lowered to 4.5–4.8 (bromocresol green) with 50% aqueous formic acid. Refluxing was resumed. The resin was refluxed under conditions of continuous removal of the aqueous phase forming in the separator. After one hour the resin was clear. After three and one-half hours a total of 21.0 parts of aqueous phase had separated. The resin was stripped to a calculated 70% solids. The batch temperature rose to 132° C. At this stage the resin was "swept" with 50.0 parts of butanol. The resin was then diluted with butanol, cooled, and filtered with filter aid. It had the following physical properties:

| | |
|---|---|
| Solids _____ percent __ | 61.4 |
| Viscosity _____ poises __ | 2.8 |
| Mineral thinner tolerance _____ | Infinite |
| Isooctane tolerance _____ | Infinite |
| Acid number _____ | 2.5 |
| Color (P. and V. scale) _____ | 2. |

The above solution was blended with the mineral spirits solution of the esterified phenolic resin in the proportions of 1.375 pints of the former to 5.875 pints of the latter and after having been thoroughly mixed therein, mineral spirits were added in the proportion of .75 pint. Rutile $TiO_2$ and lampblack and 6% cobalt naphthenate drier were incorporated in the proportions of 1 lb., ¼ lb. and ⅛ liq. ounce, respectively, for each 5.875 pints of esterified resin solution. The resulting composition was a gray primer having an NVM of 50.8% and was adapted for use on iron and other metals. After reduction with mineral spirits in the ratio of 2:1 the composition was applied to iron cabinets by flow-coating after which the coated cabinets were baked 10 minutes at 400° F. When subsequently coated with finish coats of various compositions adapted for baking at temperatures up to 400° F., the cabinets had a coating system thereon which provided excellent protection to the iron substrate. The primer afforded excellent alkali, salt spray, soap, humidity, and aerated water resistance in the system without regard to the top-coat used in combination therein. Penetration of the primer into joints and seams of the cabinet was excellent.

The proportions between the solution of esterified phenolic resin and the solution of aminotriazine/aldehyde resin in the above example can be varied widely from the ratio of 5.875:1.375 given therein. Percentagewise, the aminotriazine/aldehyde resin solids can range from as low as 1% of the total resin solids to as high as 99%. We prefer, however, to use the aminotriazine/aldehyde resin solids in amounts between about 10% and 40% by weight on the total resin solids.

Example 5

The aminotriazine/aldehyde resin solution of Example 4 was replaced with the commercial Uformite MX61 solution on a weight for weight basis with equally satisfactory results in the finished primer.

Example 6

The aminotriazine/aldehyde resin solution of Example 4 was replaced with an equal weight of the commercial melamine resin solution Melmac 247-10, with highly satisfactory primer qualities being secured.

*Example 7*

The Dow Resin 622 of Example 5 was replaced with an equal weight of an oxyalkylated resin prepared in the following manner:

| | Grams |
|---|---|
| Para tertiary butyl phenol (7.0 mols) | 1050 |
| Formaldehyde 38.7% (6.65 mols) | 516 |
| Oxalic acid | 5 |
| Dioctyl ester of sodium sulfosuccinic acid | 2 |

All the materials were placed in a 3-liter three-neck glass flask fitted with an efficient stirrer, thermometer and reflux condenser, and agitated continuously. The mixture was refluxed for 85 minutes at 88°–92° C. at which time it became a thick creamy mass. It was dehydrated by distilling at 97°–162° C. for 5 hours. A total of 395 grams of water was removed. Yield was 1112 grams of hard, brittle, yellow resin of melting point 118°–126° C.

4350 grams of the above resin dissolved in 4350 grams of hot xylene were placed in a stainless steel autoclave with 19 grams of sodium methylate and 1200 grams of ethylene oxide, and the mixture was heated to 150° C. when a drop in pressure was noted. The maximum pressure observed during the operation was 120 p.s.i. gauge. Heating was continued until the temperature reached 245° C. when the heat was shut off and the autoclave allowed to cool. Time above 150° C. was 1.75 hours. The product which was obtained was a light tan semicrystalline mass.

*Example 8*

The Dow Resin 622 of Example 4 was replaced with an equal weight of an oxylalkylated resin corresponding to Formula IV wherein R is hydrogen, $R^1$ is a methylene radical from formaldehyde, and $R''$ is a $—C_2H_4—$ group. The molecular weight was in the range of 500–800. The coating prepared by blending this resin with the aminotriazine/aldehyde resin and pigmenting it in the manner of Example 4 yielded a coating composition having properties closely like those described in that example.

It should be recognized that various solvents can be used in the above examples in place of mineral spirits, such as alcohols or aromatic solvents. As previously indicated, however, mineral spirits are preferred wherever possible when the finished composition is to be applied by flow coating. The primers of our invention can be applied at various levels of solids content with satisfactory results. In flow coating, however, mineral spirits or other relatively cheap solvent or solvent mixture is added from time to time to keep the solids content and resulting film thickness of the coatings fairly uniform. When such additions are made, however, it should be with recognition of the possibility that other solvents may have been lost from the system and should be replaced whenever necessary to ensure that the coating solution remains in a single-phase liquid state. Any separation of ingredients due to improper balance of solvents should obviously be avoided and if such a situation becomes imminent, it is within the ability of one skilled in the art to select the proper solvents or solvent mixtures for addition to correct the situation.

It will be apparent that many variations can be made in the primers of our invention within the scope described above. The examples should not be regarded as limiting, but merely illustrative of the kind of products which the invention provides.

Having now described our invention, what we claim is:

1. A coating composition whose film-forming vehicle is a mineral spirits thinnable, single-phase, organic-solvent solution comprising a blend of the following: (A) at least one oil-soluble polyhydroxylic resin having the general formula:

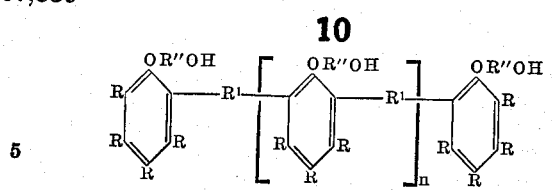

wherein R represents a monovalent radical selected from the group consisting of hydrogen and alkyl radicals of 4–18 carbons, wherein R' represents a divalent hydrocarbon radical of an aldehyde having up to 8 carbons, wherein R" represents a divalent alkylene radical of an oxyalkylene compound having up to 4 carbons, and wherein n is an integer between 1 and 13; said polyhydroxylic resin having been esterified with glyceride oil fatty acids employed in amounts between about 15% by weight on the esterified resin and equal molar amounts based on the esterifiable alcoholic hydroxyls of said polyhydroxylic resin; (B) at least one organic solvent-soluble, mineral spirits tolerant resinous aldehyde condensation product of an aminotriazine having at least one amino group and a hydrogen atom attached to the amino nitrogen of each of said groups, said aminotriazine-aldehyde resin being present in said film-forming vehicle in amounts between 1% and 99% by weight on the total of A plus B.

2. A coating composition as claimed in claim 1 wherein said B resin amounts to from 10% and 40% by weight on the total of A plus B in said film-forming vehicle.

3. A coating composition as claimed in claim 2 wherein said aminotriazine is melamine.

4. A coating composition as claimed in claim 2 wherein said aminotriazine is a bis-triazine having 4 $NH_2$ groups, and wherein butyl alcohol is reacted with the bis-triazine and the aldehyde to give a butylated resinous product.

5. A coating composition as claimed in claim 4 wherein the A polyhydroxylic resin corresponds to said general formula when R is hydrogen, wherein R' is a $—CH_2—$ group, and wherein R" is a $—C_2H_4—$ group.

6. A coating composition as claimed in claim 5 which includes pigment.

7. A coating composition as claimed in claim 2 wherein the A polyhydroxylic resin corresponds to said general formula when R is hydrogen, wherein R' is a $—CH_2—$ group, and wherein R" is a $—C_2H_4—$ group.

8. A coating composition as claimed in claim 7 wherein said aminotriazine of the B resin is melamine.

9. A coating composition as claimed in claim 8 which includes pigment.

10. A coating composition as claimed in claim 1 which includes pigment.

11. A metal article primed with a baked flow-coated film of a coating composition as claimed in claim 10.

12. A metal article primed with a baked flow-coated film of a coating composition as claimed in claim 9.

13. A metal article primed with a baked flow-coated film of a coating composition as claimed in claim 6.

References Cited in the file of this patent

UNITED STATES PATENTS

| 2,328,425 | D'Alelio | Aug. 31, 1943 |
| 2,610,955 | De Groote et al. | Sept. 16, 1952 |
| 2,610,965 | De Groote et al. | Sept. 16, 1952 |
| 2,695,894 | D'Alelio | Nov. 30, 1954 |

FOREIGN PATENTS

| 572,822 | Great Britain | Oct. 25, 1945 |

OTHER REFERENCES

Brody: Organic Finishing, pp. 8–11, Sept. 1953.
Brody: Organic Finishing, page 10, volume 14 (Sept. 1953).
Drubel et al.: Paint Oil and Chemical Rev., pages 9–10, 12–14 and 16, vol. 118, (Feb. 24, 1955).
Dow Resin 622 in Surface Coatings, November 1954, published by Dow Chemical Co.